United States Patent [19]

Townsend

[11] Patent Number: 4,940,597
[45] Date of Patent: * Jul. 10, 1990

[54] METHOD OF LUBRICATING THE PASSAGE OF MEAT EMULSION THROUGH THE STUFFING HORN OF A MEAT EMULSION ENCASING MACHINE

[75] Inventor: Ray T. Townsend, Des Moines, Iowa

[73] Assignee: Townsend Engineering Company, Des Moines, Iowa

[ * ] Notice: The portion of the term of this patent subsequent to Apr. 4, 2006 has been disclaimed.

[21] Appl. No.: 283,834

[22] Filed: Dec. 13, 1988

Related U.S. Application Data

[63] Continuation of Ser. No. 106,172, Oct. 6, 1987.

[51] Int. Cl.⁵ ............................................. A22C 11/02
[52] U.S. Cl. .................................. 426/413; 426/276; 426/284; 426/513; 17/49
[58] Field of Search ................ 426/276, 284, 413, 513

[56] References Cited

U.S. PATENT DOCUMENTS

| | | | |
|---|---|---|---|
| 3,203,807 | 8/1961 | Sloan et al. | 99/109 |
| 3,404,430 | 10/1968 | Kielsmeier et al. | 17/45 |
| 3,873,744 | 3/1975 | Townsend et al. | 426/284 |
| 4,817,244 | 4/1989 | Townsend | 17/49 |

Primary Examiner—Donald E. Czaja
Assistant Examiner—D. Workman
Attorney, Agent, or Firm—Zarley, McKee, Thomte, Voorhees & Sease

[57] ABSTRACT

A method of lubricating the passage of meat emulsion through the stuffing horn of a meat emulsion encasing machine is disclosed, involving forcing meat emulsion under a first magnitude of pressure through a passage into the inlet of a stuffing horn; then providing a first concentric ring of fluid under a second magnitude of pressure around the passage; and then providing a second tapered concentric ring of fluid around the passage with the tapered concentric ring having an outer perimeter of greater depth than its inner perimeter, and with the outer perimeter being in communication with the first concentric ring and its inner perimeter being in communication with the passage. The fluid in the rings is then subjected to a second magnitude of pressure which is greater than the magnitude of pressure imposed on the meat emulsion with the second magnitude of pressure being sufficient to cause the fluid to exit along the entire inner periphery of the second tapered concentric ring to form a fluid film between the meat emulsion and the internal surface of the stuffing horn. An apparatus for performing the method is also disclosed.

9 Claims, 3 Drawing Sheets

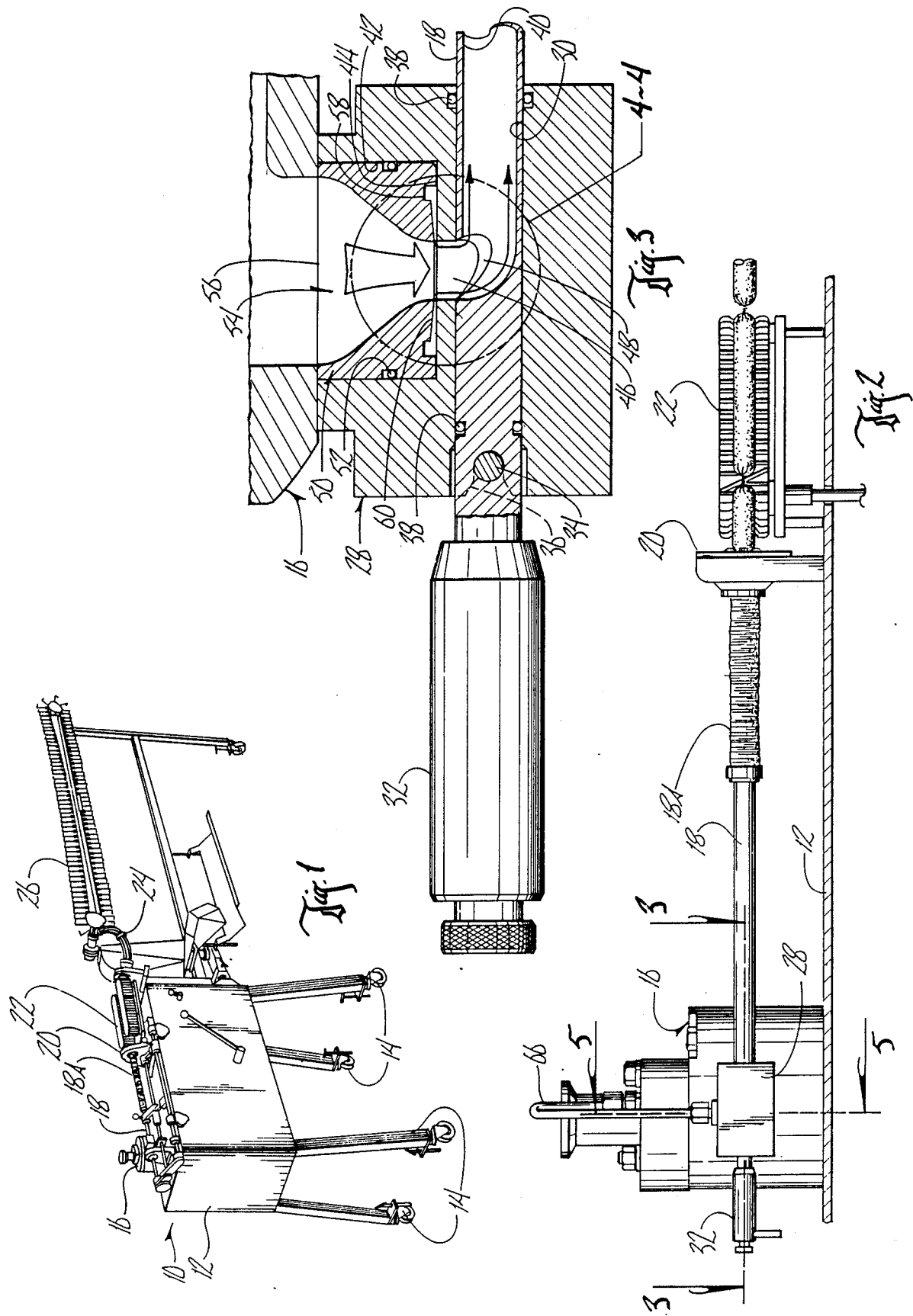

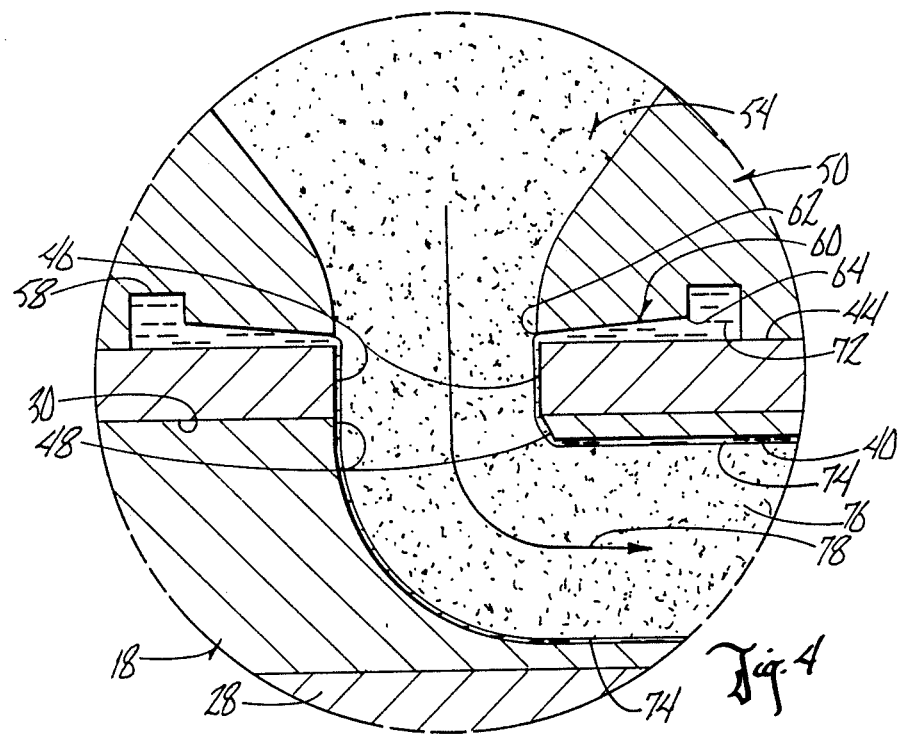
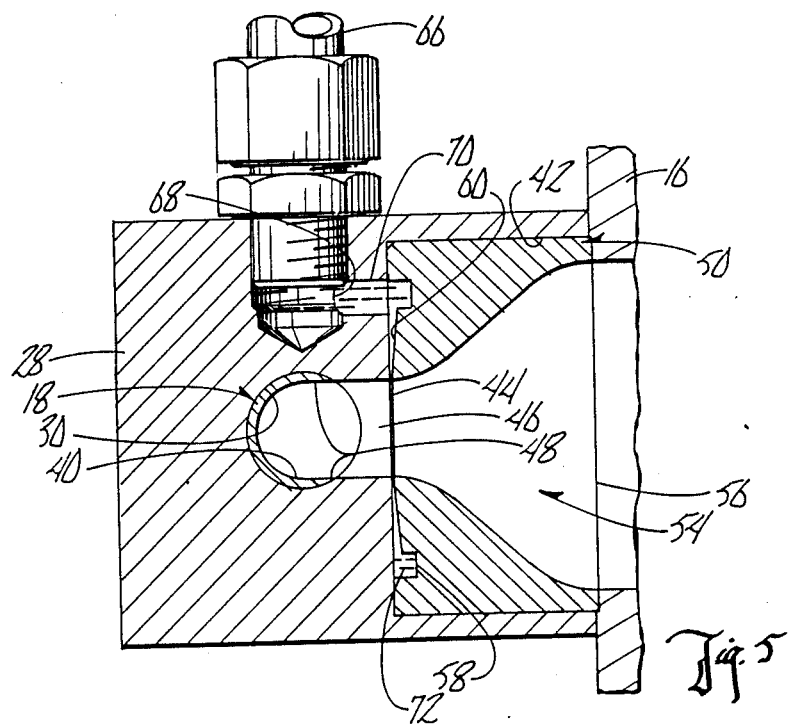

METHOD OF LUBRICATING THE PASSAGE OF MEAT EMULSION THROUGH THE STUFFING HORN OF A MEAT EMULSION ENCASING MACHINE

This is a continuation of copending application Ser. No. 106,172 filed on Oct. 6, 1987.

BACKGROUND OF THE INVENTION

Machines for manufacturing sausages and franks on a mass production basis have been in existence for sometime. A typical machine is shown in U.S. Pat. No. 3,868,747 issued Mar. 4, 1975. These machines typically use a pump to force a meat emulsion through an elongated stuffing horn, wherein the meat emulsion is discharged into an elongated casing which is thereafter rotated and linked to create the completed sausage or frank. It is well known that the movement of the meat through the stuffing horn can impose damage to the emulsion. This problem in the art is described in U.S. Pat. No. 3,922,364 issued Nov. 25, 1975, commencing in column 1:

"In all cases, it is necessary to use a stuffing tube or horn to handle the casing and because of the tube it requires substantial pressure to extrude the meat. The substantial pressure required is due to the wadding effect of the meat moving through the stuffing tube similar to the effect of a cleaning rag being pushed through the barrel of a gun. The longer the stuffing tube, the higher pressure required to push the meat product. A pressure of 100 pounds per square inch is normal to extrude most sausage products while 150 to 200 pounds per square inch (even up to 400 pounds per square inch for certain forms) is not unusual."

"One of the biggest problems with the stuffing and linking of sausage product is meat damage. This damage varies with the type of sausage and the conditions under which it is handled, such as temperature, pressure, rate, etc. and some of the more fragile products are almost impossible to handle without at least some damage."

The invention of the U.S. Pat. No. 3,922,364 was to introduce a lubrication fluid within the stuffing horn so that the fluid would form a film of lubricant between the inner surface thereof and the meat emulsion. This was a substantial improvement in the frank and sausage making art.

However, the methods and devices of the prior art which were intended to introduce the lubrication film within the stuffing horn have not been successful because they have been unable to uniformly create a film of fluid completely around the meat emulsion within the stuffing horn.

The amount of liquid used is so small that it is difficult to distribute it evenly over the entire surface of the horn without getting too much one place and not enough other places A second problem is that the horn must be pulled back and forth to allow a new casing to be fed onto it, and to do this there needs to be a continuation of the horn, or at least an attachment means that fastens to the inlet end of the horn in order to pull it back and forth. This link or attachment interferes with a continuous crack all the way around the horn which prevents even distribution of the liquid lubricant.

There are possible ways of attaching to the end of the horn and still providing a continuous crack around the meat channel or horn, but it usually involves a diameter of the hole through the horn mount or block that is larger than the horn.

One way of securing a link to the end of the horn and still provide a continuous crack around the meat channel of the horn is to provide a hole through the mounting block that is larger than the diameter of the horn. This is very objectionable because when the horn is pulled back through the block, an open clearance is left around the block which oozes or leaks the sausage until the horn moves forward again.

Therefore, it is a principal object of this invention to provide a method of lubricating the passage of meat emulsion through the stuffing horn of a meat emulsion encasing machine wherein a film of liquid lubricant can be continuously and uniformly imposed within the entire inner surface of the stuffing horn to facilitate the movement of the meat emulsion therethrough.

A further object of this invention is to provide a means of lubricating the passage of meat emulsion to the stuffing horn of a meat emulsion encasing machine wherein a film of liquid lubricant will be uniformly and continuously formed around the meat emulsion on the entire inner surface of the stuffing horn.

A still further object of this invention is to provide a method and means of lubricating the passage of meat emulsion to the stuffing horn of a meat emulsion encasing machine wherein the meat emulsion can be either flavored or otherwise treated with a releasing agent to enhance the flavor of the meat emulsion, or to facilitate the subsequent removal of a casing in which the meat emulsion is deposited.

A still further object of the invention is to provide a method and means of lubricating the passage of meat emulsion to the stuffing horn of a meat emulsion encasing machine wherein the lubrication fluid surrounds the meat emulsion before the emulsion enters the stuffing horn.

A still further object of the invention is to provide a method and means of lubricating the passage of meat emulsion to the stuffing horn of a meat emulsion encasing machine wherein the meat emulsion will not leak from the mounting block for the horn when the horn is retracted.

A still further object of the invention is to provide a method and means of lubricating the passage of meat emulsion to the stuffing horn of a meat emulsion encasing machine wherein the flow of lubrication fluid is simply and efficiently controlled by a control valve imposed on the upstream side of a pressure pump that injects fluid into the stuffing horn.

These and other objects will be apparent to those skilled in the art.

SUMMARY OF THE INVENTION

The method of this invention contemplates forcing meat emulsion under a first magnitude of pressure through a passage into the inlet of a stuffing horn; thence providing a first concentric ring of fluid under a second magnitude of pressure around the passage; and thence providing a second tapered concentric ring of fluid around the passage with the tapered concentric ring having an outer perimeter of greater depth than its inner perimeter, and with the outer perimeter being in communication with the first concentric ring and its inner perimeter being in communication with the passage. The fluid in the rings is then subjected to a second magnitude of pressure which is greater than the magnitude of pressure imposed on the meat emulsion with the second magnitude of pressure being sufficient to cause the fluid to exit along the entire inner periphery of the second tapered concentric ring to form a fluid film between the meat emulsion and the internal surface of the stuffing horn by surrounding the meat emulsion with a liquid film before it moves into the horn.

The apparatus of this invention comprises a connecting block connecting the pump and the stuffing horn with the connection block having a passage for the movement of meat emulsion from the pump to the stuffing horn. A first annular groove is located in the connecting block in spaced relation to the passage. A second tapered annular groove is in said connecting block and connects the first annular groove and the passage. Only a small crack or annular opening exists at the junction between the passage and the inner perimeter of the second annular groove. Means is then provided for supplying a source of fluid under pressure to the first annular groove whereby a thin film of fluid is deposited in the passage at the inner periphery of the second tapered annular groove before the meat emulsion enters the horn, whereby a film of fluid lubricant or the like is provided around the meat emulsion at the complete inner surface of the stuffing horn.

As the sausage from the pump moves toward the horn, it first moves through the mounting block that carries the horn. The channel through the block is at an angle (usually a right angle) to the axis of the horn. As the meat is moved through the block and into the horn, it is moved around a smooth, streamlined corner and through the side of the horn. The opening in the horn and the opening in the block are very carefully registered to give a smooth, streamlined channel from the pump, through the block, around the corner and into the horn. The film of fluid is introduced around the channel just before the sausage turns the corner. This makes it possible to move the horn back and forth without interrupting or interfering with the fluid opening or crack at the inner periphery of the second tapered annular groove. This leaves the crack free to distribute the lubrication evenly around the sausage channel so that as the sausage turns the corner and moves into the horn, the lubricant is spread over the entire inner surface of the horn to apply effective lubrication of the horn.

BRIEF DESCRIPTION OF THE DRAWINGS

FIG. 1 is a perspective view of a machine for encasing a meat product;

FIG. 2 is an enlarged scale partial sectional view of the machine of FIG. 1 showing in elevation the pump, the stuffing horn, the chuck, and the linker head;

FIG. 3 is a partial sectional view shown at an enlarged scale taken on line 3—3 of FIG. 2;

FIG. 4 is an enlarged scale sectional view showing in more detail the subject matter of the sectional area designated by the line 4—4 in FIG. 3;

FIG. 5 is a partial sectional view taken on line 5—5 of FIG. 2; and

DETAILED DESCRIPTION OF THE PREFERRED EMBODIMENT

Figure 6:
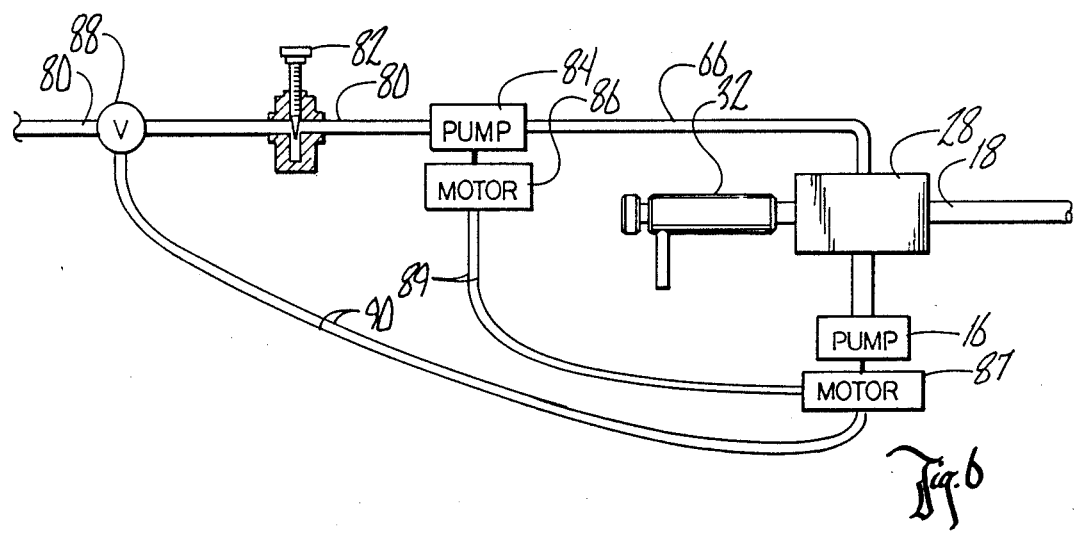
FIG. 6 is a block diagram of the fluid control system.

The numeral 10 designates a machine for encasing a meat product typically shown in U.S. Pat. No. 3,922,364. Machine 10 is comprised of frame 12, four legs 14, a pump 16, a retractable stuffing horn 18 with a shirred casing 18A thereon A conventional chuck 20 is mounted around the discharge end of stuffing horn 18. A conventional linker head 22 is mounted on frame 12 in spaced relation to the discharge end of the stuffing horn. A linker horn 24 is provided to receive linked product from the linker head, and a conventional conveyor 26 is provided to receive the product from the discharge end of the linker horn. Except for the details to be described hereafter pertaining to the means of introducing a lubricant or fluid between the meat emulsion and the inner surface of the stuffing horn, the foregoing components are conventional in the art.

A connecting block 28 is mounted on one side of pump 16. Block 28 includes an elongated bore 30 which slidably receives horn 18. The rearward end of the horn is designated by the numeral 32. As shown in FIG. 3, a transverse pin 34 extending through the solid rearward end 32 of the horn is adapted to engage notch 36 in block 28 to limit the forward movement of the horn. The presence of pin 34 in slot 36 prevents the rotation of horn 18. Conventional annular grooves and seals 38 are provided in block 28 adjacent to bore 30. The inner surface of the horn is designated by the numeral 40.

Block 28 includes a recess 42 which has a flat side wall 44. A passage 46 extends from the center of recess 42 to inlet 48 of the stuffing horn 18. As best shown in FIG. 4, passage 46 precisely registers with inlet 48 to provide a smooth channel. The inlet 48 blends with a 90° shaped bent channel portion 49 which merges with the inside surface 40 of the horn.

A nozzle insert 50 is inserted into recess 42 and is sealed therein by means of conventional annular groove and 0-ring assembly 52. A passage extension 54 in nozzle insert 50 communicates with pump outlet 56 and passage 46.

As best shown in FIG. 4, an annular concentric groove 58 is machined in the face of nozzle insert 50 around the passage 46. The groove 58 is in spaced relation to the passage 46. The annular groove 58 is in communication with the passage 46 by means of a tapered annular groove 60 which has an inner periphery 62 and an outer periphery 64. By reason of the annular groove 60 being tapered, the "depth" of the annular groove at its inner periphery 62 is less than the "depth" thereof at the outer periphery 64. The taper of groove 60 is not critical to this invention.

A fluid line 66 in communication with a source of pressurized fluid (not shown), is connected with connecting block 28 in any convenient fashion (see FIG. 5). Line 66 terminates in an outlet 68 which is in communication with a bore 70 machined in block 28. The bore 70 is also in communication with the annular groove 58.

As will be explained further hereafter, the numeral 74 designates a film of fluid ejected from the inner periphery 62 of the tapered annular groove 60, and thereupon deposited around the walls of passage 46 and around the inner surface 40 of stuffing horn 18.

While the dimensions of the connection block 28 and nozzle insert 50 can vary, it is preferred that the "vertical depth" of annular groove 58 shown in FIG. 4 should be in the order of 3/32 inches, with the "vertical depth"

of the inner periphery of the second tapered annular groove 60 being approximately 0.001 and 0.003 inches. The outer diameter of the groove 18 is 1⅛ inches and the outer diameter of the second tapered annular groove 60 is 15/16 inches. The diameter of passage 46 can vary provided that the "vertical depth" of the inner periphery of the annular groove 60 is maintained within the limits set forth above. The diameter of the passage 46 should be between approximately 0.240 and 0.654 inches. This diameter may vary as the diameter of the stuffing horn 18 varies. As shown in FIG. 4, the outer periphery 64 of annular groove 16 has a depth less than the depth of annular groove 58. The taper of the annular groove 60 is approximately 7°.

With reference to FIG. 6, a small tube 80 is connected to a liquid source under pressure such as a water line connected to city water (not shown). This tube 80 passes through an adjustable valve 82 such as a needle valve, and then to the inlet of a suitable pump 84 such as a gear pump. The pump 84 must be suitable to operate satisfactorily with a restricted inlet and still boost the outlet pressure to the maximum requirement upon demand. If "slippage" in the pump is increased because of the higher pressures, no problem will result providing the output of the pump is always more than the small volume that is required for the lubrication. The output of the pump is connected to the conduit 66 that feeds the lubricant to the block 28 and thence to the surface of the sausage.

In operation, the gear pump 84 is driven at a constant speed, preferably by the motor 86 whenever the machine 10 is in operation. Also, a magnetic stop valve 88 imposed in line 80 ahead of valve 82 shuts off the water when the metering pump is stopped. This is accomplished by lines 90 which are connected to motor 87. As an alternative, the valve 88 can be operatively connected to the conventional clutch (not shown) of pump 16 so that the valve 88 is closed when the clutch is inoperative, and vice versa. As the metering pump 16 starts, the stop valve 88 opens and allows the water to flow through the needle valve 82 which is set for the desired amount of lubricant, and then into the booster pump 84. If the stuffing horn 18 has not been lubricated yet by the water, the pressure on the meat may be quite high at least for an instant until the lubricant gets to the horn to reduce the friction. During this instant, a very high lubricant pressure may be required to get the lubricant started to flow toward the horn. This extra pressure is automatically applied by the pump 84 because it has the ability to develop the high pressure ever though its volume is restricted by the needle valve 82. As the lubricant takes effect and the pressure on the meat is reduced, the pressure on the lubricant is automatically reduced so that in effect the pressurized lubricant source (i.e., the city water pressure) is supplying the pressure as needed and the water is merely flowing through the pump at a slower rate than the normal pumping rate at the pump.

When motor 87 is turned off, motor 86 and pump 84 cease to function. Also valve 88 closes so that the water ceases to flow through line 80. This will prevent water from flowing into the system, including block 28, when the stuffing horn is withdrawn to place another casing thereon. Motor 86 could be independently controlled instead of being series connected to, and hence controlled by, motor 87.

As indicated in the above quoted portion from U.S. Pat. No. 3,922,364, the pressure on the meat emulsion within the stuffing horn when lubrication is not used can be even up to 400 pounds per square inch. It has been discovered that this pressure can even approach 500 pounds per square inch. With such high pressures, it is difficult through apparatus such as shown in U.S. Pat. No. 3,922,364, to uniformly inject fluid under pressure so that a film is completely imposed around the meat emulsion passing through the stuffing horn.

The instant invention contemplates that when the pump 16 commences to force meat emulsion 76 in the direction of arrow 78 as shown in FIG. 4, it is necessary to inject fluid under pressure through fluid line 66 at a pressure of 10 to 15 pounds per square inch greater than the pressure per square inch that the pump 16 imposes on the meat emulsion. By providing a substantially large mass of fluid under pressure in annular groove 58, and then metering that fluid under pressure through the tapered annular groove 60 through a small crack or outlet defined by the inner periphery 62 of the groove 60, it has been determined that the fluid flow will completely surround the surface of passage 46 and the inner surface 40 of stuffing horn 18. As this resulting film of fluid 74 surrounds the meat emulsion 76, the resistance to flow of the meat emulsion is substantially reduced. As a result, the pressure per square inch on the meat emulsion may drop to around 20 pounds per square inch, and the pressure on the fluid in the annular grooves 58 and 60 is reduced to approximately 35 pounds per square inch.

The present invention is successful in that it will establish a film of fluid completely around the periphery of the passage 46 and the inner surface 40 of stuffing horn 18. Again, this is accomplished through the cooperative structure of the annular grooves 58 and 60 wherein a supply of fluid is ejected into passage 46 along a feather-edge defined by the inner periphery 62 of the groove 60. As a result, most if not all of the damaging effects on the meat emulsion as it moves through the stuffing horn, as defined in U.S. Pat. No. 3,922,364, are avoided.

In addition, when the meat emulsion pump 16 and motor 86 are stopped, the water supply is automatically shut down by magnetic valve 88. Further, needle valve 82 provides a simple and efficient way to control the flow of fluid by controlling the fluid flow to pump 84. This arrangement is much easier to accomplish than by controlling the speed of operation of pump 84.

Accordingly, it is seen that this invention will achieve at least its stated objectives.

What is claimed is:

1. A method of lubricating a meat emulsion, comprising the steps of:
    introducing meat emulsion into an emulsion stuffing tube,
        said tube having an emulsion intake end and an emulsion discharge end,
    extruding said emulsion in tubular form from said tube by subjecting the meaty emulsion to pressure to move said emulsion from the intake end to the discharge end of said tube,
    introducing a film of lubricating fluid into said tube near the emulsion intake end of said tube, said film being in intimate contact with the interior of said tube and the outer surface of said meat emulsion for substantially the entire length of said tube to eliminate emulsion smear along the entire length of said tube, and
    holding said tube against rotation.

2. The method of claim 1 wherein said fluid is a flavoring additive for said meat emulsion.

3. The method of claim 1 wherein said fluid is a releasing agent to permit a casing material into which said meat emulsion is deposited to be thereafter easily removed from said meat emulsion after said meat emulsion is cured.

4. The method of claim 1 wherein said second magnitude of pressure on said fluid is approximately 10 to 15 pounds per square inch greater than said first magnitude of pressure exerted on said meat emulsion.

5. The method of claim 1 wherein the depth of said narrow annular opening is limited to between approximately 0.001 and 0.003 inches.

6. The method of claim 1 wherein both said first magnitude of pressure on said meat emulsion and said second magnitude of pressure on said fluid is reduced while said fluid film is being created between said meat emulsion and the internal surface of said passage.

7. The method of claim 4 wherein said first magnitude of pressure on said meat emulsion and said second magnitude of pressure on said fluid is reduced while said fluid film is being created between said meat emulsion and the internal surface of said passage.

8. The method of claim 6 wherein said first magnitude of pressure ranged between 500 and 20 pounds per square inch.

9. The method of claim 4 wherein said first magnitude of pressure ranges between 500 and 20 pounds per square inch.

* * * * *